(12) United States Patent
Kass et al.

(10) Patent No.: US 8,427,484 B1
(45) Date of Patent: Apr. 23, 2013

(54) AUTHORED MOTION TRANSITIONS (75) Inventors: Michael Kass, Berkeley, CA (US);
Warren Trezevant, Oakland, CA (US)

(73) Assignee: Pixar, Emeryville, CA (US)

( * ) Notice: Subject to any disclaimer, the term of this patent is extended or adjusted under 35 U.S.C. 154(b) by 649 days.

(21) Appl. No.: 12/509,220

(22) Filed: Jul. 24, 2009

Related U.S. Application Data

(60) Provisional application No. 61/158,280, filed on Mar. 6, 2009.

(51) Int. Cl.
*G06T 13/20* (2006.01)
*G06T 13/40* (2011.01)

(52) U.S. Cl.
USPC ........... 345/474; 345/419; 345/473; 345/475; 382/107

(58) Field of Classification Search .................. 345/419, 345/473–474; 382/107
See application file for complete search history.

(56) References Cited

U.S. PATENT DOCUMENTS

| | | | | |
|---|---|---|---|---|
| 5,801,687 A * | 9/1998 | Peterson et al. | ............... | 715/201 |
| 5,982,389 A * | 11/1999 | Guenter et al. | ............... | 345/474 |
| 6,462,742 B1 * | 10/2002 | Rose et al. | .................... | 345/473 |
| 6,686,918 B1 * | 2/2004 | Cajolet et al. | ................ | 345/473 |
| 7,464,010 B2 * | 12/2008 | Yang et al. | ......................... | 703/2 |
| 7,589,732 B2 * | 9/2009 | Burtnyk et al. | ............... | 345/474 |
| 2005/0071306 A1 * | 3/2005 | Kruszewski et al. | ........... | 706/47 |
| 2009/0179901 A1 * | 7/2009 | Girard | .......................... | 345/474 |
| 2010/0207949 A1 * | 8/2010 | Spencer | ........................ | 345/473 |

OTHER PUBLICATIONS

Wiley, D.J. et al.; Interpolation synthesis of articulated figure motion; Aug. 6, 2002; Computer Graphics and Applications, IEEE; vol. 17, Issue 6, pp. 39-45.*

* cited by examiner

*Primary Examiner* — Xiao M. Wu
*Assistant Examiner* — Todd Buttram
(74) *Attorney, Agent, or Firm* — Kilpatrick Townsend & Stockton LLP (57) ABSTRACT

An animation creator authors a transition between two different pre-authored motions of a degree of freedom of an object such as an animatronic or virtual character. The author selects an arbitrary position to begin the transition and the transition ends at the position where a subsequent state of a degree of freedom of the object begins. The selected position is arbitrary because an initial state of the degree of freedom of the object is not known until the complete motion of the object is determined. The transition is transformed to begin where the initial state ends and to end where the subsequent state begins. The transition is transformed to retain the general shape of the authored transition and to provide the same quality of motion as the pre-authored motions. The transformed transition may be scaled in time such that limits of velocity and/or acceleration for the object are not violated.

20 Claims, 7 Drawing Sheets

AUTHORED MOTION TRANSITIONS

CROSS-REFERENCES TO RELATED APPLICATIONS

This application claims priority to U.S. Provisional Patent Application No. 61/158,280, filed on Mar. 6, 2009, which is incorporated herein for all purposes.

TECHNICAL FIELD

The present invention relates to computer animation graphics and, more particularly, to a method for authoring a transition between two motions of a degree of freedom of an object.

BACKGROUND

An animator may create movement of an object, such as an animated character or a robot, by selecting several pre-animated clips or paths of motion for the object. In many cases, the pre-animated clips do not provide a continuous path of motion. Rather, a transition is required between two clips such that the object's motion appears natural and does not jump suddenly between different states.

One type of transition requires a previous motion of an object to end at a home position such that a subsequent motion begins movement of the object from the home position. However, this type of transitioning does not reflect natural character movement because, using this approach, a moving part of an object repeatedly returns to the same position before another movement is initiated. In this regard, it would appear more natural to continue the movement from the end point of the previous motion.

Some types of object movement include a blend of pre-animated clips and puppeted motion where the animation has a relative position to the puppeted motion. However, "pops" may appear in the animation when the image of the first or last frame of a transition does not exactly match the first or last frame of an animated clip or the puppeteering. While this may be acceptable in a digital environment, an attempt to suddenly move from one position to a discontinuous position may cause the malfunction of a electro-mechanical robotic system that includes motors and gears.

Pre-computed motions may be sequenced together by calculating a transition to connect two different graphs of an animation variable that describe motion of an object over a period of time. One movement function for an animation variable may end at a first position and, after a time delay, a subsequent movement function for the same animation variable may begin at a different position. Thus, in some cases, a transition may be calculated to provide a smooth variable transition between the two movement functions. However, in most cases, the calculated transition does not appear natural due to an obvious change in the character's motion.

Accordingly, what is desired are improved methods for solving some of the problems discussed above. Additionally, what is desired are improved methods for reducing some of the drawbacks discussed above.

SUMMARY

The present invention allows an animation creator to author a transition between two different pre-authored motions of an object such as an animatronic or virtual character. The author selects an arbitrary position to begin the transition and the transition ends at the position where a subsequent state of a degree of freedom of the object begins. The selected position is arbitrary because an initial state of the degree of freedom of the object is not known until the complete motion of the object is determined. In accordance with embodiments of the present invention, the transition is transformed to begin where the initial state of the object ends and to end where the subsequent state of the object begins. The transition is transformed to retain the general shape of the authored transition and to provide the same quality of motion as the pre-authored motions such that the motion of the object appears seamless and natural. The transformed transition may also be scaled in time such that the transition does not violate limits of velocity and acceleration for the object.

In some embodiments, the present invention is directed to a method for providing a transition between two motions of a degree of freedom of an object. The method includes receiving as input an authored transition that describes motion of an object over time between an initial state of a degree of freedom of the object and a subsequent state of the degree of freedom of the object. The transition begins at an arbitrary position and ends at a position where the subsequent state of the degree of freedom of the object begins. The method also includes transforming the received transition to begin at a position where the initial state of the object is substantially at an end. The transformed transition substantially retains the shape of the received transition to provide a continuous motion between the initial and the subsequent states.

In other embodiments, the present invention is directed to a method for providing motion of an object based on a plurality of animation variables. The method includes receiving as input a plurality of authored transitions. Each authored transition corresponds to at least one animation variable that describes motion of a different portion of an object over time between an initial state of a degree of freedom of the corresponding portion of the object and a subsequent state of the degree of freedom of the corresponding portion of the object. Each transition begins at an arbitrary position and ends at a position where the subsequent state of the degree of freedom of the corresponding portion of the object begins. The method also includes transforming each received transition to begin at a position where the initial state of the degree of freedom of the corresponding portion of the object is substantially at an end. The transformed transition substantially retains the shape of the received transition to provide a continuous motion for the corresponding portion of the object between the initial and subsequent states. The method further includes: identifying which transformed transitions violate limits; scaling the identified transitions to remain within the limits; and providing the object with motion based on each of the plurality of animation variables including at least one of the initial states, the subsequent states and the transitions between the corresponding initial states and the corresponding subsequent states.

These and other advantages of the invention will be apparent to those of ordinary skill in the art by reference to the following detailed description and the accompanying drawings.

BRIEF DESCRIPTION OF THE DRAWINGS

In order to more fully understand the present invention, reference is made to the accompanying drawings. Understanding that these drawings are not to be considered limitations to the scope of the invention, the presently described embodiments and the presently understood best mode of the invention are described with additional detail through use of the accompanying drawings.

DETAILED DESCRIPTION

In some embodiments, the present invention allows an animation creator to author a transition between two different pre-authored motions of an object such as an animatronic or virtual character. The author selects an arbitrary position to begin the transition and the transition ends at the position where a subsequent state of a degree of freedom of the object begins. The selected position is arbitrary because an initial state of the degree of freedom of the object is not known until the complete motion of the object is determined. In accordance with some embodiments of the present invention, the transition is transformed to begin where the initial state of the object ends and to end where the subsequent state of the object begins. The transition is transformed to retain the general shape of the authored transition and to provide the same quality of motion as the pre-authored motions such that the motion of the object appears seamless and natural. The transformed transition may also be scaled in time such that the transition does not violate limits of velocity and acceleration for the object.

In some cases, an object may be animated by controlling the motion and performance of the object using pre-animated clips and/or live puppeteering. For example, an object in a video game may move in response to user input from a joystick. Similarly, a character in an animated sequence may be moved by selecting a function from a pre-defined library of animated sequences that model movements for the character. In another example, a mechanical robot may move in response to input from a puppeteer's electro-mechanical controller. To achieve improvisational responses and the desired behavior, the animator/puppeteer needs to be able to transition from any position, regardless of whether the position was provided from animated or puppeted motion, to any new animation clip or puppeted response. Furthermore, in the case of the mechanical robot, the robot's motion of a degree of freedom needs to respect all motor position, speed and acceleration limits in order to safely move the robot without causing any mechanical components to malfunction.

An object is typically associated with a collection of animated variables that describe the object's motion over time. For example, one variable may correspond to a joint angle of a character's elbow or knee, and another variable may correspond to position of the character's head based on a swivel value of the character's neck. Control of each animated variable may be either relative or absolute. Relative motion control refers to motion that ends at a home position such that any subsequent motion begins from the home position. Absolute motion control refers to motion that continues from any position where a previous motion ended without having to return to a home position.

In one example of relative animation control, when an animated character interacts with a different character, the eyeline between the characters should be maintained. This eyeline is kept through a combination of the yaw (around) and pitch (up-and-down) controls. When the character wants to respond with a nod in the affirmative, the core eyeline should not be disrupted. In this case, the animated motion moves relative to the current position, i.e., the values of the animation are added to the current position. To do this, the system identifies the character's current position, determines the difference between the current position and the first value of the animated spline, and applies the difference to the spline. As a result, the motion of the character continues ahead smoothly.

Illustratively, an animation clip or a puppeteer has a character at a current pitch position of +20 (degrees) and then triggers a "NOD HEAD" animation sequence which begins with a value of +5. The difference between the two values is determined (i.e., 15) and added to the animation. The animation then begins with a start value of +20. As a result, animation variables with relative animation control tend to have the same start and ending position, resulting in a cycle.

In one example of absolute animation control, when an animated character is scared, the character may cover his face with his hands. The motion of the head and hands should be strictly choreographed such that the character does not appear to hit his head with his hands. In this case, the character's head and hand motions should follow absolute positions such that a nodding movement begins from a current position of the head and hands rather than a home position.

Figure 1:
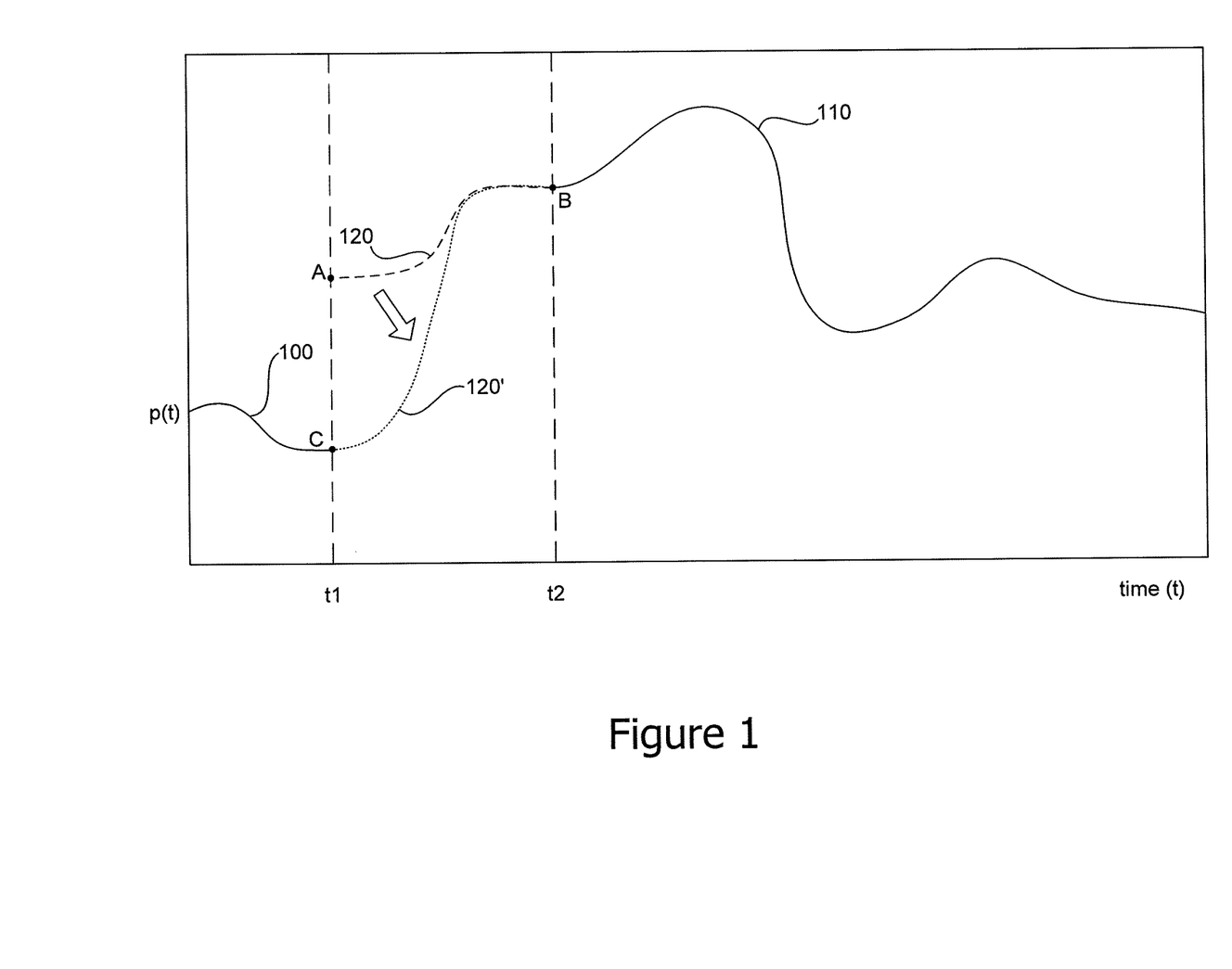
FIGS. 1-4 each illustrate a graph of a variable that describes motion of a degree of freedom of an object over time, including an authored transition that is transformed to provide a smooth transition between two motions of the degree of freedom of the object.

FIG. 1 illustrates a graph of a variable that describes motion of one degree of freedom of an object over time (p(t)). For example, the degree of freedom may correspond to a single motor of a robot or an angle of movement of a joint in a virtual character. The graph includes a first motion 100, a second motion 110, an authored transition 120 between the first and second motions 100, 110, and a transformed version 120' of the authored transition that connects the first and second motions 100, 110. The first and second motions 100, 110 may be pre-authored or pre-calculated such as those retrieved from a library of animated motions. The second motion 110 may also be an absolute motion relative to the first motion 100 such that the second motion 110 seeks to begin at a position where the first motion 110 ends. In accordance with embodiments of the present invention, the transformed version 120' of the authored transition provides a smooth, natural transition between the first and second motions 100, 110 such that the transformed version 120' is continuous with a value where the first motion 100 ends.

The first motion 100 ends at time t1, and the second motion 110 begins at time t2. An animator or puppeteer may only be responsible for the second motion 110 such that he may be aware of the position of the object at time t2 (i.e., a subsequent state) but unaware of the position of the object at time t1 (i.e., an initial state). As a result, the author of the transition cannot be certain of the initial state of the object at time t1 due to the first motion 100. The author, therefore, selects an arbitrary position (A) as a starting position for the authored transition 120. The starting position that is selected for the authored transition 120 is probably different from the object's actual position after the first motion 100 is complete at time t1. The author then creates the authored transition 120 beginning at position (A) and ending at the subsequent state (i.e., position (B) at time t2) where the second motion 110 begins. The author determines the shape of the authored transition 120 to maintain the integrity of the object's performance. As shown in FIG. 1, the authored transition 120 is created to begin and end with zero velocity. However, as discussed below, this need not be the case.

In accordance with embodiments of the present invention, the authored transition 120 is transformed to the transformed version 120' of the authored transition such that, at time t1, the transformed transition 120' begins at the position where the first motion 100 ends (i.e., at p(t)=C). The transformed transition 120' provides continuous, natural motion of the character between the two motions 100, 110.

The transformed transition 120' may easily provide a smooth transition between the first and second motions 100, 110 when the first motion 100 ends with zero velocity and the second motion 110 begins with zero velocity. However, in some embodiments, the first motion 100 may end at a given velocity, and/or the second motion 110 may begin at a given velocity. In this case, the transformed transition 120' may "dovetail" between the two given velocities such that a zero velocity is provided after the end of the first motion 100 and before the beginning of the second motion 110.

Figure 2:
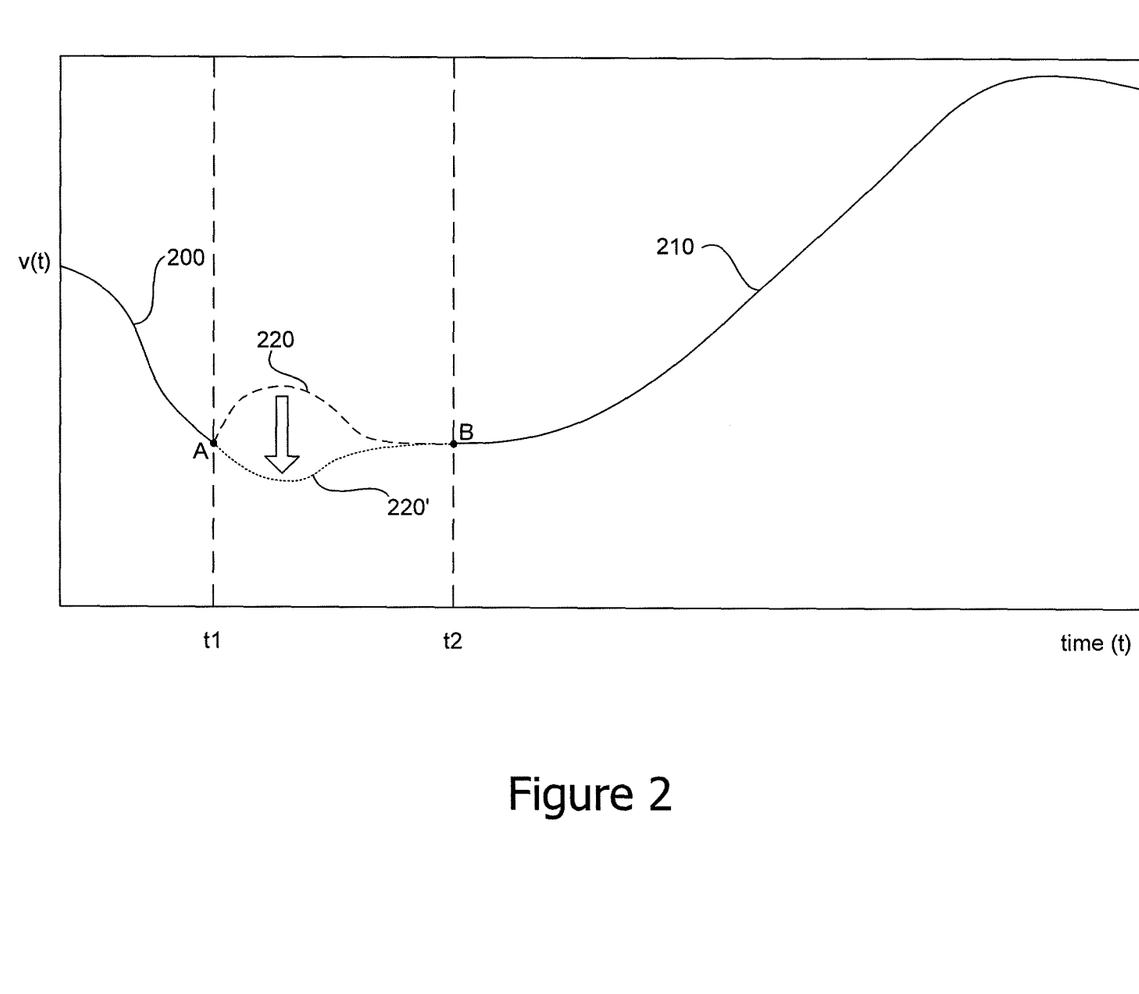

FIG. 2 illustrates a graph of a variable that describes motion of one degree of freedom of an object over time (v(t)). For example, the degree of freedom may correspond to a velocity of a single motor of a robot or an acceleration of motion of a body part of a virtual character. The graph includes a first motion 200, a second motion 210, an authored transition 220 between the first and second motions 200, 210, and a transformed version 220' of the authored transition that connects the first and second motions 200, 210. As described above with reference to FIG. 1, the transformed transition 220' provides smooth, natural motion between the first and second motions 200, 210 such that the transformed transition 220' is continuous with a value where the first motion 200 ends.

The first motion 200 ends at time t1, and the second motion 210 begins at time t2. The author selects a value at time t1 as an initial velocity for the authored transition 220. The author then creates the authored transition 220 beginning at position (A) at time t1 and ending at position (B) at time t2 where the second motion 210 begins. The position of the object at both time t1 and at time t2 is the same because v(t) describes the velocity of the object. The author determines the shape of the authored transition 220 to maintain the integrity of the object's performance. As shown in FIG. 2, the authored transition 220 is created to begin with a negative velocity and end with zero velocity. Since the second motion 210 begins with a zero velocity, the authored transition 220 dovetails smoothly into the second motion 210. The author may have selected the authored transition 220 to begin at a negative velocity in anticipation that the first motion 200 would end with a negative velocity. However, this assumption was incorrect because the first motion 200 actually ends with a positive velocity.

In accordance with embodiments of the present invention, the authored transition 220 is transformed to the transformed version 220' of the authored transition such that, at time t1, the transformed transition 220' begins with the same velocity that the first motion 200 ends. Since the authored transition 220 was created to begin with a negative velocity and the first motion 200 ends with a positive velocity, it is difficult to retain the shape of the authored transition 220 without causing the motion of the object to appear unnatural between the two motions 200, 210. As a result, the transformed transition 220' provides a continuous, natural change in velocity between the two motions 200, 210 while attempting to retain the shape of the authored transition 220 as much as possible.

Figure 3:
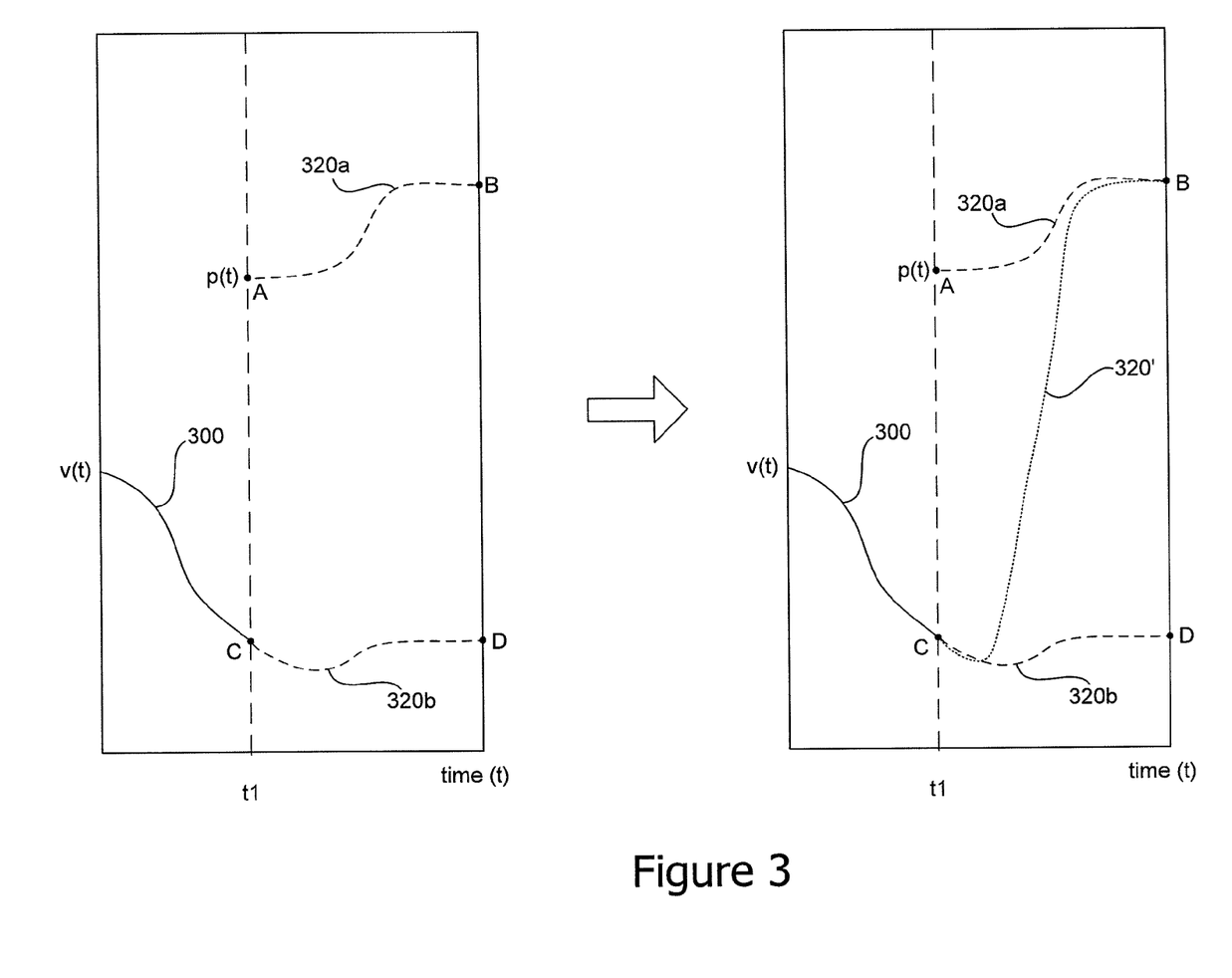

FIG. 3 illustrates a graph of more than one variable for describing motion of more than one degree of freedom of an object over time. For example, one degree of freedom may correspond to an object's position (p(t)) and another degree of freedom may correspond to the object's velocity (v(t)). The graph includes a first motion 300, a first authored transition 320a corresponding to object position, and a second authored transition 320b corresponding to object velocity. The first authored transition 320a begins at position (A) at time t1 and ends at position (B) at time t2. The first motion 300 ends with a positive velocity at position (C) at time t1. The second authored transition 320b begins at position (C) at time t1 and ends at position (D) at time t2. As shown in FIG. 3, the second authored transition 320b provides a smooth, continuous motion from the first motion 300. This may be coincidental, i.e., the author of the second authored transition 320b may have accurately guessed where the first motion 300 would end. More likely, however, the second authored transition 320b was previously transformed as described above with reference to FIG. 2.

The two authored transitions 320a, 320b may be transformed to provide a single transformed transition 320'. As shown in FIG. 3, a single transition may be desired that begins at position (C) at time t1 and ends at position (B) at time t2. However, as would be understood by one having ordinary skill in the art, other beginning and/or ending points may be provided. In one embodiment, the transformed transition 320' is formed by adding the first and second transitions 310a, 310b together. As a result, the transformed transition 320' begins at a velocity corresponding to the first motion 300 and ends at the same position where the first authored transition ends, i.e, at position (B). Thus, the transformed transition 320' provides smooth, natural motion between the first motion 300 and the motion following the first authored transition 320a.

The motion of an object may have some constraints related to velocity and acceleration. For example, in some embodiments, the motion of a robot has speed and acceleration limits due to mechanical limitations of the motors and gears which power the movement of the robot. Similarly, a virtual character may have limits on how quickly any of its body parts should be moved. In this case, the transformed transition is altered to extend its duration such that limits on speed and acceleration are not exceeded. In some embodiments, the duration of the transformed transition may be too long such that the motion of the object appears too slow. For example, the position of the object may already be near the desired destination such that the duration of the transformed transition may be reduced to provide more naturally appearing motion. In some cases, the position of the object after the first motion may be at the position where the second motion begins such that the transition is not necessary. Due to such limitations, the duration of the transformed transition may be altered without violating the speed/acceleration limits. In some embodiments, the transformed transition is made to be as short as possible without violating either the velocity or acceleration limits.

To illustrate the situation where velocity/acceleration limits are exceeded, the distance of travel between the object's position at the end of a first motion to where the object's position should be at the beginning of a second motion due to the transformed transition may take a longer period of time to travel than the same time period of an authored transition. In other words, the transformed transition is too fast and therefore violates velocity and/or acceleration limits. In this case, as shown in FIG. 4, the amount of time allotted for an authored transition is extended to increase the time to complete a transformed transition 420 in order to remain within established velocity/acceleration limits.

Figure 4:
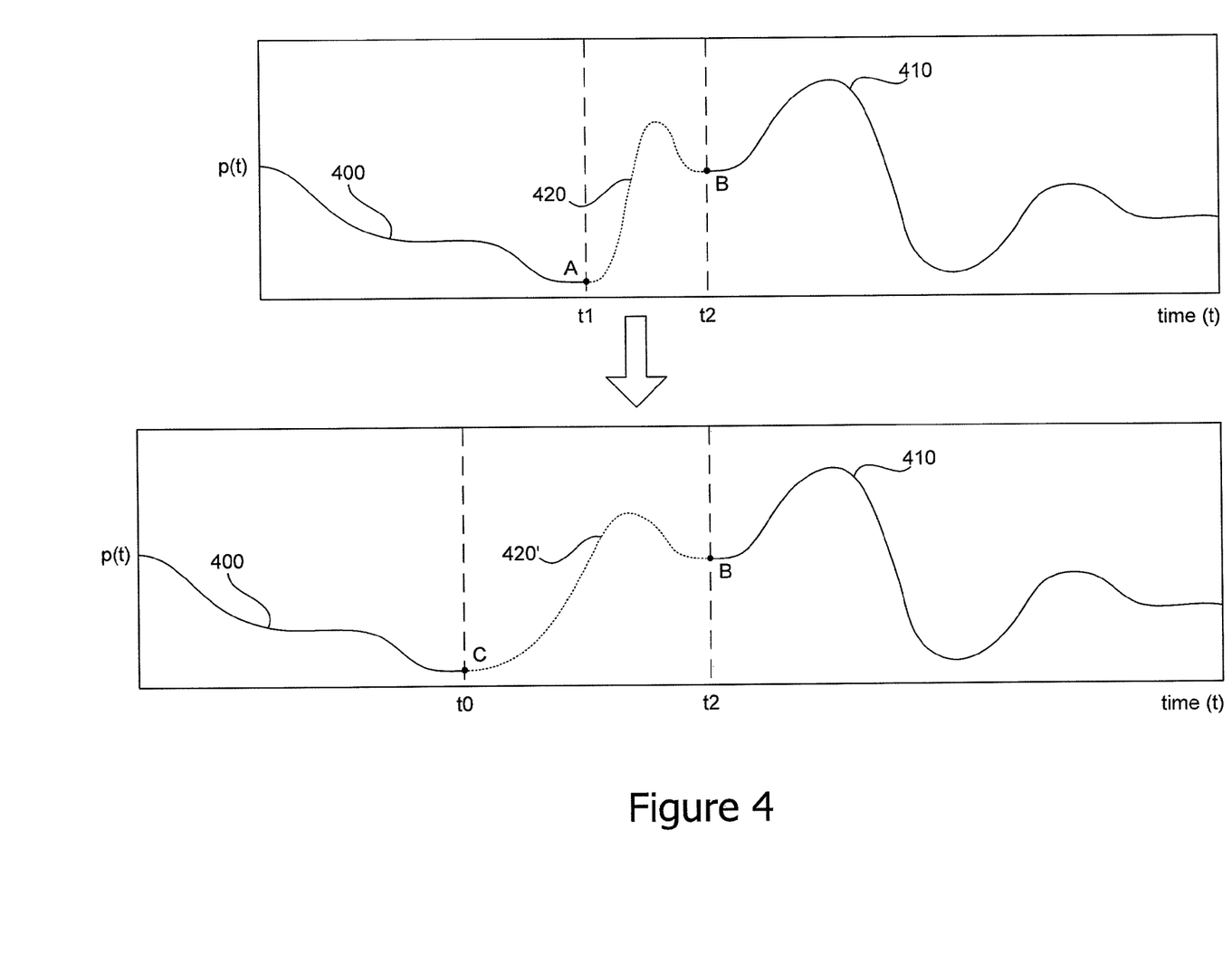

As shown in FIG. 4, an authored transition (not shown) provided between a first motion 400 and a second motion 410 is transformed to the transformed transition 420, as described above with reference to FIG. 1. The transformed transition 420 begins at position (A) at time t1 and ends at position (B) at time t2. However, the steep slope of the transformed transition 420 may cause motion of the object to violate velocity and/or acceleration limits. In other words, recreating the motion depicted by the transformed transition 420 may cause the object to move too quickly thereby overly straining mechanical elements of a robot or otherwise providing undesired object motion.

In this case, the transformed transition 420 is scaled to increase its duration such that a scaled version 420' of the transformed transition 420 remains within velocity/acceleration limits while also retaining the integrity of the object's motion between the first motion 400 and the second motion 410. As shown in FIG. 4, the scaled transition 420' is extended over time such that it begins at time t0 at position (C) where the first motion 400 ends and ends at position (B) at time t2 where the second motion 410 begins. Scaling the transformed transition 420 to begin at a later time than t0 would not address the problem of exceeding velocity/acceleration limits. Similarly, scaling the transformed transition 420 to begin at an earlier time than time t0 would cause the object to move unnecessarily slowly.

In the case where the duration of the transformed transition is too long, the transformed transition is similarly altered to shorten its duration. As a result, the velocity and/or acceleration of the object is increased to exceed minimum value limits.

Figure 5:
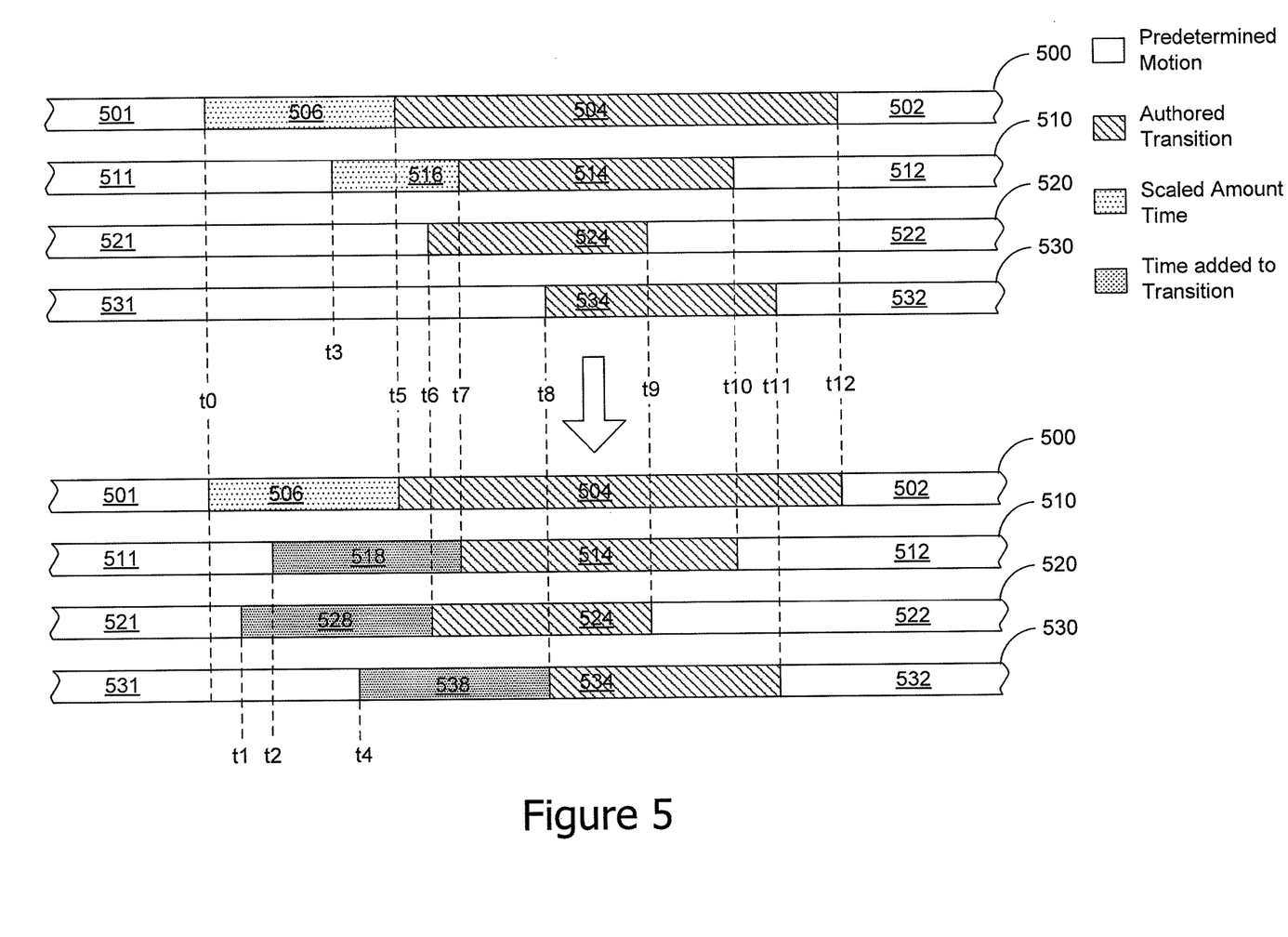
FIG. 5 illustrates a graph of different variables that each describe motion of a different degree of freedom of an object over time, including authored transitions that are transformed and optionally scaled to provide smooth, continuous motion for the different degrees of freedom of the object.

Multiple variables are commonly used to describe different motions of the same object that occur simultaneously. The action of the object described by the different variables may be illustrated by different motion functions as illustrated in FIG. 5. Each motion function corresponds to a degree of freedom for the corresponding variable, and each motion function has independently authored transitions.

As shown in FIG. 5, four different articulation variables are illustrated by motion functions 500, 510, 520, 530. Each motion function 500, 510, 520, 530 includes a first predetermined motion 501, 511, 521, 531, a second predetermined motion 502, 512, 522, 532 and an authored transition 504, 514, 524, 534 that has been transformed to provide a continuous, naturally appearing transition between the corresponding first predetermined motion 502, 512, 522, 532 and the second predetermined motion 504, 514, 524, 534, as described above with reference to FIGS. 1-3. The transformed authored transitions 504, 514, 524, 534 may begin at different, arbitrary times (i.e., t5, t6, t7, t8).

Some of the authored transitions that have been transformed may also need to be scaled in time to meet velocity and/or acceleration constraints, as described above with reference to FIG. 4. Illustratively, the motion function 500 includes the transformed authored transition 504 provided for the second predetermined motion 502. The transformed authored transition 504 is scaled by extending the transformed authored transition 504 an amount of time such that the path of motion in the transformed authored transition does not exceed velocity and/or acceleration constraints. For example, the transformed authored transition 504 begins at time t5. However, in order to avoid violating velocity and/or acceleration limits, the transformed authored transition 504 is scaled to begin at time t0. In other words, the duration of the transformed authored transition 504 is expanded over a period of time corresponding to reference number 506. Similarly, the duration of the transformed authored transition 514 is scaled from time t7 to an amount of time corresponding to reference number 516 such that the transformed authored transition 514 now begins at time t3. In accordance with some embodiments of the invention, each transformed authored transition 504, 514 may be independently scaled without reference to any other transition. In this example, the transformed authored transitions 524, 534 do not exceed velocity and/or acceleration limits and, therefore, do not require any scaling.

In some embodiments, the motion of the object is modeled using the transformed and scaled transitions of the motion functions 500, 510, 520, 530. However, as discussed below, an animator or puppeteer may desire to further scale other variables based on the scaled transition that begins first.

After the appropriate transformed transitions are scaled, a determination is made as to which authored transition has been scaled to begin first. This determination may be used to scale the other authored transitions. In other words, the authored transition that begins first may govern the scaling factor for the other authored transitions between predetermined paths of motion for different parts of the same object.

As shown in FIG. 5, the scaled amount of time 506 for the transformed authored transition 504 begins before the scaled amount of time 516 for the transformed authored transition 514 (i.e., t0<t3). In some embodiments, the scaled amount of time 506 may be used to further scale the transformed authored transition 514 as well as to scale the remaining transformed authored transitions 524, 534 that have not been scaled. The other transformed authored transitions 514, 524, 534 are scaled such that the overall motion of the character appears more natural. In other words, if only one or two variables are scaled, any other additional variables may appear as if the corresponding motion begins after a noticeable time delay.

In order to compensate for the time shift of the transformed authored transition 504 which is scaled from time t5 to begin at time t0, the other transformed authored transitions 514, 524, 534 are also scaled accordingly. In one embodiment, the other transformed authored transitions 514, 524, 534 are scaled an amount of time corresponding to reference number 506 (i.e., t5−t0). Illustratively, the other transformed authored transitions 514, 524, 534 are scaled an amount of time corresponding to reference numbers 518, 528, 538, respectively, where the scaled amount of time for each of the transformed authored transitions 514, 524, 534 is substantially the same as the amount of time corresponding to reference number 506 (i.e., t5−t0=t7−t2=t6−t1=t8−t4).

In another embodiment, the other transformed authored transitions 514, 524, 534 are scaled an amount of time which is proportional to the amount of time by which the transformed authored transition 504 is scaled. For example, for purposes of illustration, the transformed authored transition 504 is performed for four seconds (i.e., t12−t5=4 seconds) and is further scaled for one second (i.e., t5−t0=1 second). In other words, the transformed authored transition 504 is scaled an additional 25%. In this embodiment, the other transformed authored transitions 514, 524, 534 are scaled an amount of time corresponding to 25% of the total time of the authored transitions. For example, if transformed authored transition 514 proceeds for three seconds (i.e., t10−t7=3 seconds), the time added to the transition would be 0.75 seconds (i.e., t7−t2=0.75 seconds). Similarly, if the transformed authored transitions 524, 534 each have a duration of two seconds (i.e., t9−t6=2 seconds and t11−t8=2 seconds), the time added to each transition would be 0.5 seconds (i.e., t6−t1=t8−t4=0.5 seconds).

In some embodiments, additional scaling may be necessary for the scaled versions of transformed authored transitions 514, 524, 534 in order to prevent violation of velocity/acceleration limits. For example, the transformed authored transition 524 that is scaled an amount of time corresponding to reference number 528 may appear to move too slowly relative to the paths of motion. In this case, the scaling factor may be shortened or eliminated such that motion of the object due to transformed authored transition 524 appears more natural.

Figure 6:
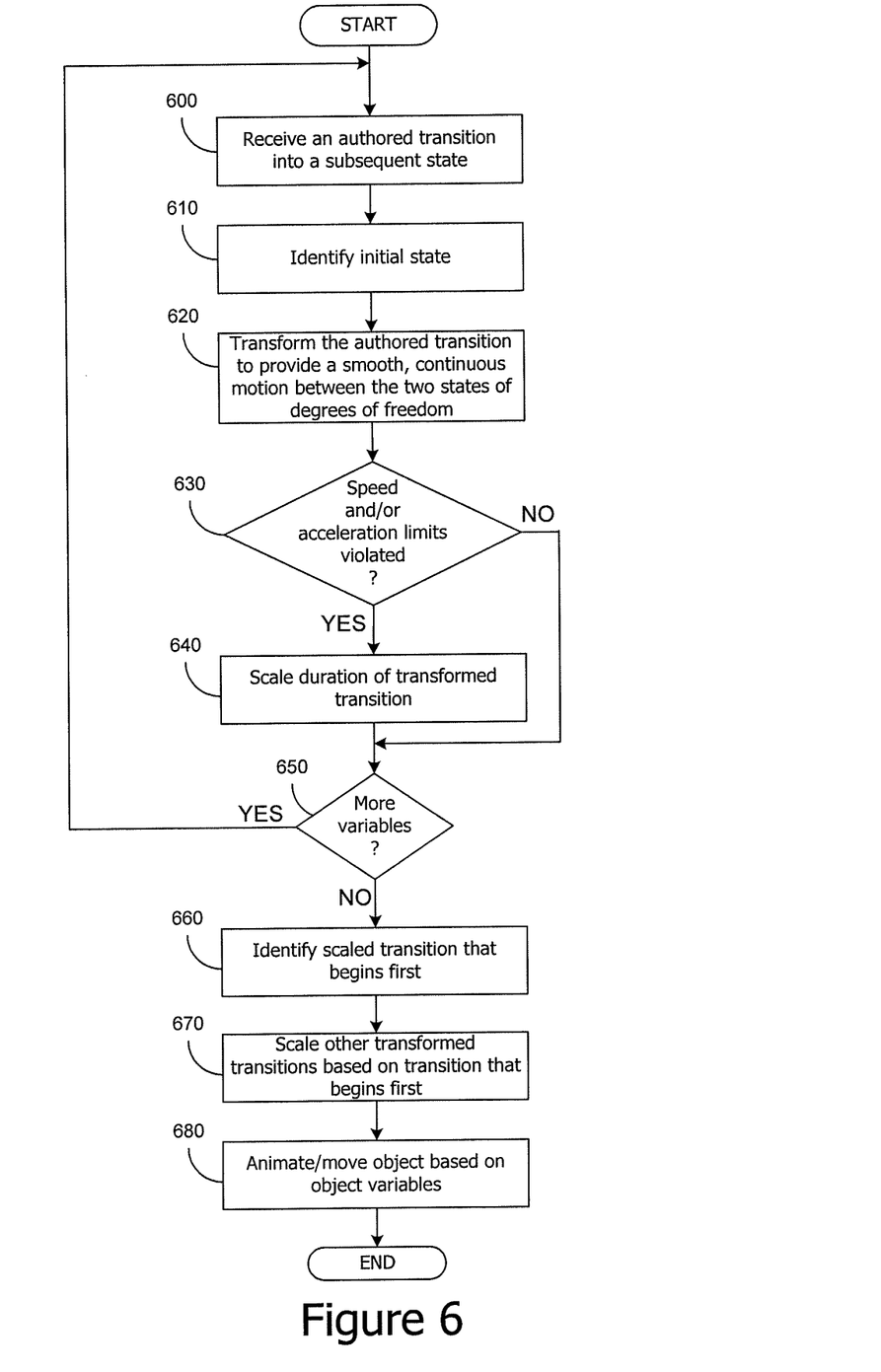
FIG. 6 is a flow diagram that illustrates a method for transforming and scaling authored transitions to provide smooth, continuous motion of a degree of freedom of an object.

FIG. 6 is a flow diagram that illustrates a method for transforming and scaling authored transitions to provide smooth, continuous motion of degrees of freedom of an object in accordance with some embodiments of the present invention. The method begins when an authored transition into a subsequent state of a degree of freedom of the object is received (step 600). The subsequent state of the degree of freedom may be a subsequent predetermined motion. An animator creates the authored transition to provide an arbitrary position for the object at an initial time and a path of motion of the degree of freedom to a position and time that corresponds to the beginning of the subsequent predetermined motion. Thus, the authored transition is continuous with the subsequent predetermined motion.

When the animation sequence for the object is generated, an initial state of the degree of freedom of the object that occurs previous to the authored transition and the subsequent state of the degree of freedom is identified (step 610). For example, the initial state may be a previous predetermined motion. When the initial state ends, the position of the object is provided at a given location. Most likely, the given location of the object is not the same location that corresponds to the position of the object at the arbitrary position selected by the animator at the beginning of the authored transition.

The authored transition is then transformed such that the transformed authored transition begins at the same time and location where the initial state of the degree of freedom of the object ends, and ends at the same time and location that the authored transition did before the transformation (i.e., at the same time and position as the beginning of the subsequent state of the degree of freedom) (step 620). The transformed transition seeks to retain the general shape of the authored transition. As a result, a smooth, continuous motion is provided between the initial and the subsequent states.

A determination is then made whether the transformed transition violates velocity and/or acceleration limits (step 630). For example, the transformed transition may cause motion of a robot to proceed too quickly and exceed mechanical limitations. In this case, the duration of the transformed transition should be extended. Similarly, the transformed transition may cause motion of a virtual character to proceed too slowly because the position of the character after the first motion is very close to the position of the character at the beginning of the second motion. In this case the duration of the transformed transition should be shortened.

The determination of whether velocity/acceleration limits are violated can be expressed by Eqs. 1 and 2, where:

$a_{max}$=maximum acceleration limit
$a_{hi}$=highest acceleration of object during the transformed transition
$a_{lo}$=lowest acceleration of object during the transformed transition
$v_{max}$=maximum velocity limit
$v_{hi}$=highest velocity of object during the transformed transition
$v_{lo}$=lowest velocity of object during the transformed transition if $|a_{max}|>|a_{lo}|$, and if $|v_{max}|>|v_{lo}|$, then shorten the duration of the transformed transition until $$|a_{max}|\approx|a_{lo}|, \text{ or } |v_{max}|\approx|v_{lo}|. \quad \text{(Eq. 1)}$$

if $|a_{max}|<|a_{hi}|$, or if $|v_{max}|<|v_{hi}|$, then extend the duration of the transformed transition until $$|a_{max}|\geq|a_{hi}|, \text{ and } |v_{max}|\geq|v_{hi}|. \quad \text{(Eq. 2)}$$

In other words, if both the velocity and acceleration of the object are too slow during the transformed transition, then the duration of the transformed transition is shortened until either the acceleration or velocity is essentially the same as the corresponding maximum value. Similarly, if either the velocity or the acceleration of the object are too fast during the transformed transition, then the duration of the transformed transition is lengthened until both of the acceleration or velocity are less than or essentially equal to the corresponding maximum values.

If velocity and/or acceleration limits are not violated, processing proceeds to step 650. If velocity and/or acceleration limits are violated, processing continues to step 640 where the transformed transition is scaled over time. In other words, the duration of the transformed transition is lengthened or shortened as discussed above such that the scaled transition does not violate velocity and/or acceleration limits.

A determination is then made whether more variables for modeling motion of the object require processing (step 650). Motion of an object is commonly modeled by multiple variables that describe the movement of different portions of the object that occurs simultaneously. If additional variables are available for the object, processing returns to step 600. Otherwise, processing continues to step 660.

The transition which has been scaled to begin first is identified (step 660). The transition that has been scaled to begin first begins at a time before any of the other transitions. The other transitions may be scaled based on the transition that begins first (step 670). In some embodiments, the other transitions are scaled the same amount of time as the scaled amount of time of the transition that begins first. In other embodiments, the other transitions are scaled proportional to the amount of time that the transition that begins first is scaled. Scaling the other transitions based on the transition that begins first provides a more natural movement for the object such that the other variables do not appear to initiate motion of the corresponding portions of object after a noticeable delay. The object is then caused to move based on the variables associated with the motion of the different portions of the object (step 680). Processing then terminates.

Figure 7:
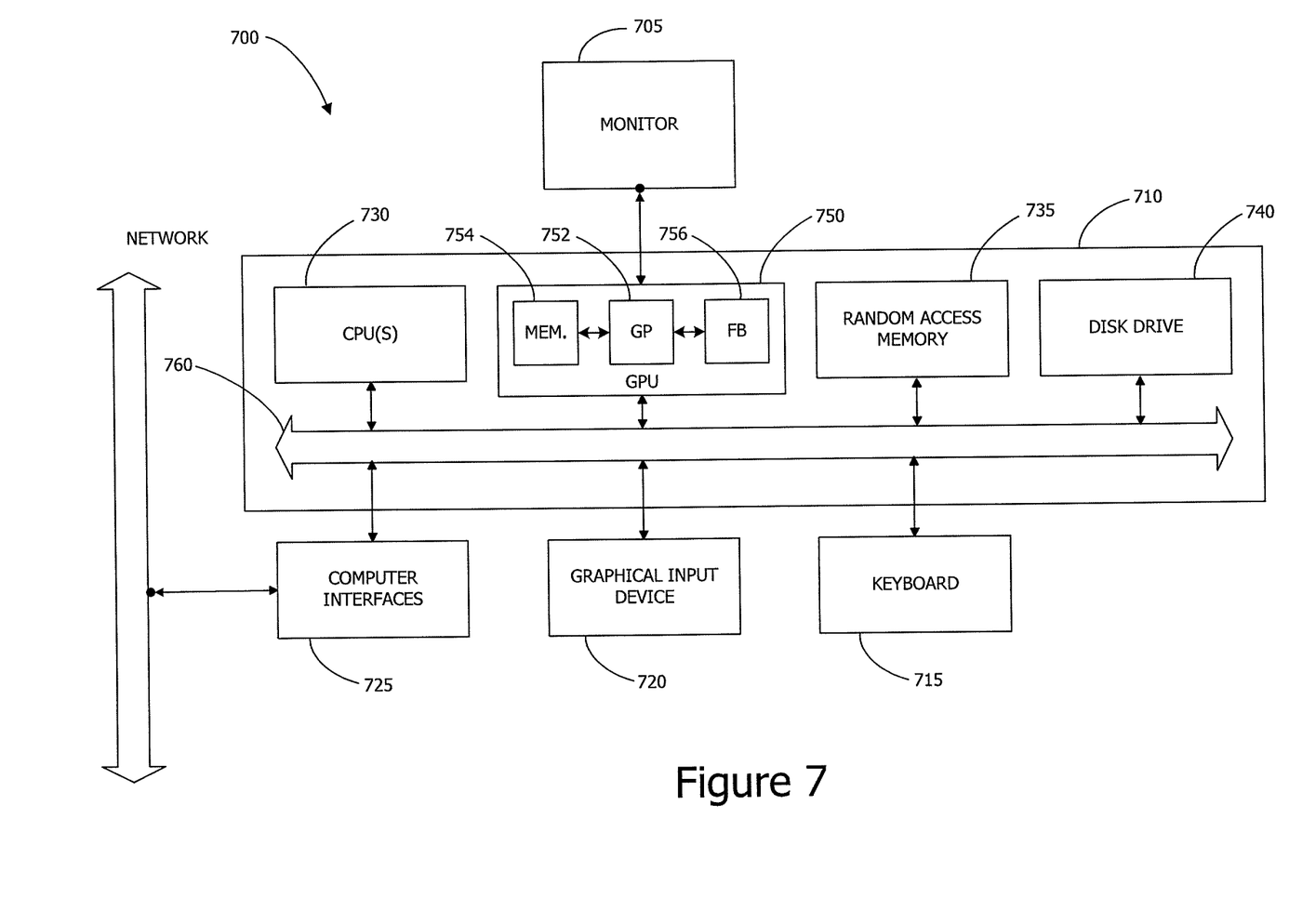
FIG. 7 is a block diagram of a computer system that may be used to practice embodiments of the present invention.

FIG. 7 is a block diagram of a computer system that may be used to practice embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, computer system 700 typically includes a monitor 705, computer 710, a keyboard 715, a user input device 720, computer interfaces 725, and the like.

In various embodiments, user input device 720 is typically embodied as a computer mouse, a trackball, a track pad, a joystick, wireless remote, drawing tablet, voice command system, eye tracking system, and the like. User input device 720 typically allows a user to select objects, icons, text and the like that appear on the monitor 705 via a command such as a click of a button or the like.

Embodiments of computer interfaces 725 typically include an Ethernet card, a modem (telephone, satellite, cable, ISDN), (asynchronous) digital subscriber line (DSL) unit, FireWire interface, USB interface, and the like. For example, computer interfaces 725 may be coupled to a computer network, to a FireWire bus, or the like. In other embodiments, computer interfaces 725 may be physically integrated on the motherboard of computer 710, and may be a software program, such as soft DSL, or the like.

In various embodiments, computer 710 typically includes familiar computer components such as a processor 730, and memory storage devices, such as a random access memory (RAM) 735, disk drives 740, a GPU 750, and system bus 760 interconnecting the above components.

In some embodiment, computer 710 includes one or more Xeon microprocessors from Intel. Further, one embodiment, computer 710 includes a UNIX-based operating system.

RAM 735 and disk drive 740 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 750 may be any conventional graphics processing unit that may be user programmable. Such GPUs are available from NVIDIA, ATI, and other vendors. In this example, GPU 750 includes a graphics processor 752, a number of memories and/or registers 754, and a number of frame buffers 756.

FIG. 7 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

As can be seen from the above description, the present invention allows an animation creator to author a transition between two different pre-authored motions of an object such as an animatronic or virtual character. The author selects an arbitrary position to begin the transition and the transition ends at the position where a subsequent state of a degree of freedom of the object begins. The selected position is arbitrary because an initial state of the degree of freedom of the object is not known until the complete motion of the object is determined. In accordance with embodiments of the present invention, the transition is transformed to begin where the initial state of the object ends and to end where the subsequent state of the object begins. The transition is transformed to retain the general shape of the authored transition and to provide the same quality of motion as the pre-authored motions such that the motion of the object appears seamless and natural. The transformed transition may also be scaled in time such that the transition does not violate limits of velocity and acceleration for the object.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A computer-implemented method for providing a transition between two motions of a degree of freedom of an object, the method comprising:
   receiving as input an authored transition that describes motion of an object over time between an initial state of a degree of freedom of the object and a subsequent state of the degree of freedom of the object, wherein the authored transition has at least a start time, and end time and a duration and begins at an arbitrary position at the start time and ends at a position where the subsequent state of the degree of freedom of the object begins at the end time, the arbitrary position being such that when two or more motions of degrees of freedom of objects are being transitioned, the start time of the transition can be different for different degrees of freedom of objects and, for at least two degrees of freedom of objects, their transition's start times are distinct; and
   transforming the received transition to begin at a position where the initial state of the degree of freedom of the object is substantially at an end, wherein the transformed transition substantially retains the shape of the received transition to provide a continuous motion between the initial and the subsequent states.

2. The method according to claim 1, further comprising:
   scaling the transition such that limits are not violated.

3. The method according to claim 2, wherein scaling the transition comprises:
   altering the duration of the transformed transition.

4. The method according to claim 2, wherein the limits correspond to velocity values.

5. The method according to claim 2, wherein the limits correspond to acceleration values.

6. The method according to claim 1, wherein the object is a video game character or an animatronic robot.

7. The method according to claim 1, wherein the initial state, the transition and the subsequent state correspond to an animation variable that models motion of a portion of the object over time.

8. A computer-implemented method for providing motion of an object based on a plurality of animation variables, the method comprising:

receiving as input a plurality of authored transitions, each authored transition corresponding to at least one animation variable that describes motion of a different portion of an object over time between an initial state of a degree of freedom of the corresponding portion of the object and a subsequent state of the degree of freedom of the corresponding portion of the object, wherein each authored transition has at least a start time, and end time and a duration and begins at an arbitrary position at the start time and ends at a position where the subsequent state of the degree of freedom of the corresponding portion of the object begins at the end time, each arbitrary position being such that when two or more animation variables are being transitioned, the start time of the transition can be different for different animation variables;

transforming each received transition to begin at a position where the initial state of the degree of freedom of the corresponding portion of the object is substantially at an end, wherein the transformed transition substantially retains the shape of the received transition to provide a continuous motion for the corresponding portion of the object between the initial and subsequent states;

identifying which transformed transitions violate limits;

scaling the identified transitions to remain within the limits; and providing the object with motion based on each of the plurality of animation variables including at least one of the initial states, the subsequent states and the transitions between the corresponding initial states and the corresponding subsequent states wherein, for at least two animation variables, their transition's start times are distinct.

9. The method according to claim 8, wherein scaling the identified transitions comprises:

altering the duration of at least one identified transition.

10. The method according to claim 8, wherein the limits correspond to velocity values.

11. The method according to claim 8, wherein the limits correspond to acceleration values.

12. The method according to claim 8, further comprising:

identifying which scaled transition begins first; and scaling at least some of the other transitions based on the identified scaled transition.

13. The method according to claim 12, wherein the at least some of the identified transitions are scaled by the same amount of time as the scaled transition that begins first.

14. The method according to claim 12, wherein the at least some of the identified transitions are scaled by an amount of time that is proportional to the amount of time that the scaled transition that begins first is scaled.

15. The method according to claim 8, wherein the object is a video game character or an animatronic robot.

16. A system for providing a transition between two motions of a degree of freedom of an object, the system comprising:

a storage device configured to store a plurality of motion functions, wherein each motion function corresponds to at least one animation variable that describes motion of a portion of an object over time; and a processing component in communication with the storage device, the processing component being configured to:

a) receive as input an authored transition, wherein the authored transition describes motion of the object over time between an initial state of a degree of freedom of the object and a subsequent state of the degree of freedom of the object; and b) transform the received authored transition to begin at a start time and at a position where the initial state of the degree of freedom of the object is substantially at an end, wherein the transformed transition substantially retains the shape of the received transition to provide a continuous motion between the initial and subsequent states, and wherein, for at least two degrees of freedom of objects, their transition's start times are distinct.

17. The system of claim 16, wherein the processing component is further configured to:

scale the transition such that limits are not violated.

18. The system of claim 17, wherein the processing component scales the transition by altering the duration of the transformed transition.

19. The system of claim 16, wherein the received transition begins at an arbitrary position and ends at a position where the subsequent state of the degree of freedom of the object begins.

20. A computer program product having a non-transitory computer readable medium storing a set of code modules which when executed by a processor of a computer system cause the processor to provide motion of an object based on a plurality of animation variables, the non-transitory computer readable medium comprising:

code for receiving as input a plurality of authored transitions, at least some of the authored transition corresponding to an animation variable that describes motion of a different portion of an object over time between an initial state of a degree of freedom of the corresponding portion of the object and a subsequent state of the degree of freedom of the corresponding portion of the object, wherein the transition begins at an arbitrary position and ends at a position where the subsequent state of the degree of freedom of the corresponding portion of the object begins;

code for transforming each received authored transition to begin at a start time and at a position where the initial state of the degree of freedom of the corresponding portion of the object substantially at an end, wherein the transformed transition substantially retains the shape of the received transition to provide a continuous motion for the corresponding portion of the object between the initial and subsequent states, and wherein, for at least two degrees of freedom of objects, their transition's start times are distinct;

code for identifying which transformed transitions violate limits;

code for scaling the identified transitions to remain within the limits, wherein, for at least two degrees of freedom of objects, their transition's start times are distinct;

code for identifying which scaled transition begins first; and code for scaling at least some of the other transitions based on the scaled transition that begins first.

* * * * *